US009796594B2

(12) United States Patent
Gandhi et al.

(10) Patent No.: US 9,796,594 B2
(45) Date of Patent: Oct. 24, 2017

(54) PROCESS FOR PRODUCING TRICHLOROSILANE

(71) Applicant: Summit Process Design, Inc., Missoula, MT (US)

(72) Inventors: Sumeet Dharampal Gandhi, Richland, WA (US); Bruce Hazeltine, Missoula, MT (US)

(73) Assignee: Summit Process Design, Inc., Missoula, MT (US)

( * ) Notice: Subject to any disclaimer, the term of this patent is extended or adjusted under 35 U.S.C. 154(b) by 227 days.

(21) Appl. No.: 14/566,459

(22) Filed: Dec. 10, 2014

(65) Prior Publication Data
US 2015/0158732 A1 Jun. 11, 2015

Related U.S. Application Data

(60) Provisional application No. 61/914,253, filed on Dec. 10, 2013.

(51) Int. Cl.
*C01B 33/107* (2006.01)
(52) U.S. Cl.
CPC .................. *C01B 33/1071* (2013.01)
(58) Field of Classification Search
CPC ................................. C01B 33/1071

USPC .................................... 423/341, 342
See application file for complete search history.

(56) References Cited

U.S. PATENT DOCUMENTS

| 4,526,769 A | 7/1985 | Ingle et al. |
| 5,063,040 A | 11/1991 | Ruff |
| 8,298,490 B2 | 10/2012 | Fahrenbruck et al. |
| 2004/0047793 A1 | 3/2004 | Mleczko et al. |
| 2008/0056979 A1 | 3/2008 | Arvidson et al. |
| 2009/0142246 A1* | 6/2009 | Masuda ............ B01D 3/14 423/342 |
| 2012/0189526 A1 | 7/2012 | Petrik et al. |
| 2012/0328503 A1 | 12/2012 | Fahrenbruck |
| 2015/0030520 A1* | 1/2015 | Dassel ............ C01B 33/10763 423/342 |

OTHER PUBLICATIONS

English translation for Jp 57-118,017, Jul. 1982.*

* cited by examiner

Primary Examiner — Ngoc-Yen Nguyen
(74) Attorney, Agent, or Firm — Jean Kyle

(57) ABSTRACT

The invention relates to an improved process to manufacture TCS in a polysilicon plant based upon combining a high temperature FBR process reacting metallurgical grade silicon, hydrogen, and silicon tetrachloride (STC) to make trichlorosilane (TCS) and a high temperature thermal converter to hydrogenate STC to TCS and hydrogen chloride.

8 Claims, 7 Drawing Sheets

HYDROCHLORINATION TCS PLANT

DIRECT CHLORINATION-STC CONVERTER TCS PLANT

SILANE PLANT

PROCESS FOR PRODUCING TRICHLOROSILANE

CROSS-REFERENCE TO RELATED APPLICATIONS

This application claims the benefits of U.S. Provisional Application No. 61/914,253, filed Dec. 10, 2013, the disclosure of which is hereby incorporated by reference in its entirety including all figures, tables and drawings.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

FIELD OF THE INVENTION

This invention relates generally to processes to make halosilanes, most commonly trichlorosilane (TCS). It involves chemical synthesis of TCS from metallurgical grade silicon (MGSI), silicon tetrachloride (STC), hydrogen ($H_2$), and hydrogen chloride (HCl) in a fluidized bed reactor (FBR) and also from only $H_2$ and STC in a gas phase thermal reactor. It presents advantageous methods to combine these two different processes to make TCS into a single process train thus minimizing both capital and operating costs.

BACKGROUND OF THE INVENTION

Chemical vapor deposition (CVD) reactors are used to produce polycrystalline silicon (polysilicon), the key raw material used in the manufacture of most semiconductor devices and silicon-based solar wafers and cells. The most widely used method for producing polysilicon is the Siemens reactor process generally according to the primary reactions below:

$$HSiCl_3 + H_2 \rightarrow 3HCl + Si$$

$$HCl + HSiCl_3 \rightarrow SiCl_4 + H_2$$

Net: $4HSiCl_3 \rightarrow Si + 2H_2 + 3SiCl_4$

In commercially significant polysilicon processes, STC, $H_2$, dichlorosilane (DCS) and HCl are all significant byproducts of the CVD operations along with lesser amounts of monochlorosilane (MCS), silane ($SiH_4$), and trace contaminants containing metals, donor and acceptor atoms, and carbon bearing species. In addition to TCS, significant amounts of $H_2$ are fed to the CVD reactor and the single pass conversion of TCS is well under 50%. Variations of this process have been in commercial existence for about fifty years and are widely reported in the literature. In this process, high temperature polysilicon rods are placed in a reactor, and trichlorosilane (TCS) gas is passed over these rods. A portion of the silicon in the gas is deposited on the rods, and when the rods have grown large enough, they are removed from the reactor. The end product is in the form of polysilicon rods or chunks, which can be further processed into ingots, then sliced into wafers that are made into solar cells, for example.

In a related process, TCS is disproportionated to form silane ($SiH_4$) and STC. The silane produced is used in many processes associated with semiconductors and other products, including making polysilicon in either a Siemens reactor or fluidized bed CVD process. The fluidized bed process makes silicon in irregular, but nominally spherical beads in diameters typically ranging up to about 2 mm diameter. The general chemistry of these reactions is as follows:

$$4HSiCl_3 \rightarrow SiH_4 + 3SiCl_4$$

$$SiH_4 \rightarrow Si + 2H_2$$

In the exhaust of a TCS CVD reactor, the chlorosilanes ($Si_x$—$Cl_{4-x}$) are separated from the the non-condensable gases ($H_2$ and HCl) by relatively simple condensation steps and then followed by energy intensive and capital intensive processes consisting of compression, HCl absorption, HCl stripping, and $H_2$ pressure-swing adsorption (PSA) steps to remove HCl from the $H_2$. The by-products of the STC converter are similar to those produced in the CVD reactors and have traditionally been subjected to the same or very similar off-gas recovery (OGR) designs.

In all commercial processes using TCS as a feedstock, the initial step of production of TCS can be further classified as direct chlorination process or the hydrochlorination process, both processes being widely referenced in the literature, though nomenclature is not necessarily consistent. It is the TCS thus produced that is reacted with $H_2$ in Siemens style chemical vapor deposition (CVD) reactors or disproportionated to make $SiH_4$.

The process converting TCS into silane and the CVD-based Siemens process for manufacturing polysilicon both produce a large amount of the byproduct silicon tetrachloride (STC). For example, a maximum of about 20 kg of STC is made as a byproduct for every kg of polysilicon or silane produced. It is possible, however, to hydrogenate STC forming TCS by reacting STC with hydrogen in the gas phase in a reactor commercially referred to as an STC Converter at 800-1200° C. where 14-24% of the STC is typically hydrogenated in each pass through the reactor according to the following reaction:

$$SiCl_4 + H_2 \rightarrow HCl + HSiCl_3$$

The product TCS can then be recycled to a series of silane disproportionation reactors and separation steps to make silane, or to a CVD reactor for direct production of more polysilicon.

Most commercial STC converter processes use molar feed ratios of $H_2$:STC between 2.0:1 and 3:1 according the process of FIG. 1. In this process, the STC converter reaction chemistry is insensitive to pressure, but the industrially practiced range has been predominantly 4-7 BarG. Most commercially available STC converters are retrofitted Siemens CVD reactors having multiple graphite rods for heaters and a flat baseplate where feed-through electrical connections are made to the graphite rods. When conducted in a Siemens style STC converter, it is costly to increase the pressure due to a large flat baseplate forming the bottom of the reactor and the reaction step itself does not benefit from increased pressure. In the entire STC converter process to make TCS, the OGR system which separates reactor effluent products and reactants and recycles unreacted feeds must be considered, and this part of the process benefits significantly from operation at higher pressure.

The OGR process is a very energy intensive process mainly due to the difficulties of separating $H_2$ and HCl.

Since, hydrogen and HCl cannot be separated by a simple condensation process and would require excessive energy if separated via cryogenic distillation, alternate methods such as membrane separation processes have been evaluated. Even a membrane separation process is not deemed feasible for separation of $H_2$ and HCl. No durable membrane technology exists at a competitive capital cost. Consequently, polysilicon producers typically use STC to absorb HCl from the $H_2$/HCl mixture. TCS, which has higher vapor pressure than STC, has also been used to absorb HCl. Whether using TCS or STC to absorb HCl from $H_2$, significant amounts of the chlorosilane exist in the $H_2$ when it is subsequently fed to a PSA (pressure swing adsorption) or TSA (temperature swing absorption) operation to remove residual HCL and trace impurities. The presence of these chlorosilanes reduces the capacity of PSA or TSA adsorbent beds to adsorb the impurities of concern. Use of either TCS or STC for HCl absorption is an energy intensive process.

Another process to hydrogenate STC to TCS is what is commercially known as a hydrochlorination FBR process. In this process, MGSI, $H_2$, and STC are fed into a FBR where the following net reaction occurs, typically at a temperature of 500 to 600° C. and typically 15-30 BarG.

$$Si+2H_2+3SiCl_4 \rightarrow 4HSiCl_3$$

In this process, approximately 15-25% of the STC fed is reacted in a single pass and typical molar feed ratios are 1.5:1 to 2.5:1 $H_2$:STC. The process benefits significantly from higher pressures and temperatures due to improved equilibrium conversion. As a result, the process is very expensive due to high pressure and temperature ratings required on relatively large process equipments. Vessels must be made of fairly thick walls with high nickel alloys. Both the metals used and the fabrication techniques are quite expensive.

If STC could not be hydrogenated and recycled, there would be a huge loss of the primary raw materials silicon and chlorine and a cost for disposal of the byproduct STC. Thus, efficient polysilicon plants are built as a substantially closed loop processes as illustrated in FIGS. 1 and 2. FIG. 1A shows a typical polysilicon plant utilizing hydrochlorination technology. In this drawing, a hydrochlorination plant 2 provides TCS to CVD operations 1 and the CVD operations return $H_2$ and STC to the TCS plant. Impurities and byproducts are purged from the TCS plant and make-up raw materials MGSI, $H_2$, and STC/HCl are fed to the plant. The hydrochlorination plant produces TCS from MGSI and also hydrogenates STC from the CVD operations.

FIG. 1B shows a typical polysilicon plant utilizing a direct chlorination plant 4 to make TCS from MGSI plus HCl and an STC hydrogenation plant 3 to hydrogenate STC plus $H_2$ to TCS. CVD operations 1 are the same as in the hydrochlorination based plant.

FIG. 1C shows a silane plant 5 coupled to a TCS plant 6, and CVD operations 7. In FIG. 1C, TCS plant 6 can represent the non-CVD operations of FIGS. 1A and 1B. In this FIG., TCS is supplied from the TCS plant to a silane plant which produces Silane and returns STC according the reaction:

$$4HSiCl_3 \rightarrow SiH_4+3SiCl_4$$

It should be understood that in FIGS. 1A, 1B, and 1C, many operations occur within each block and additional minor feed streams may exist as feeds enter and byproduct and impurity streams may leave the processes.

FIG. 2 shows a typical hydrochlorination synthesis plant. MGSI 242 is conveyed into a low pressure hopper 201 through line 248. A series of valves is manipulated in lines 248 and 202 in order to transfer the abrasive solid through line 202 into high pressure hopper 203. Valves are then manipulated to transfer the abrasive solid through line 204 into the hot and high pressure FBR 205. MGSI reacts with hot feed gases coming in through line 217 and FBR product leaves through line 206, where it may go through interchanger 207 and line 208, or go directly to quench vessel 209.

The primary function of the quench 209 is to stop fine particulates of MGSI and metals salts such as $FeCl_3$ and $AlCl_3$ from moving further through the process train. (Fe and Al are impurities typically present in MGSI that from volatile salts in the FBR). This is accomplished by countercurrent flow of a dilute slurry (lines 230, 231 and pump 233) of the fine particulates in STC and TCS through a packed bed against the rising vapors. A portion of the dilute slurry is fed through line 232 to stripper 234 where it flows counter current against a $H_2$ stream 228 fed into the bottom of the stripper and leaving the top of the stripper as line 229 saturated with volatile components. This concentrates the silicon particulates that may have been carried out of the FBR 205 and also the volatile metal salts into a residue stream. The residue stream 235 comprising STC, TCS and solids slurry is finally discharged into a low pressure slurry handling and recovery unit 236 where some portion of the STC and TCS present are recovered via stream 237 and join the condensate stream 247 forming stream 223. Solids and residual chlorosilanes plus impurities in stream 238 are treated for final disposal in unit 239. A typical practice is to hydrolyze and neutralize stream 238 with neutralizing media 240, leaving waste stream 241 for disposal as dictated by local practices and regulations.

Vapor leaves the top of quench vessel 209 through line 210 where some of the chlorosilanes in the vapor stream are condensed in condenser 249. Some of the condensate 219 is refluxed via line 220 and some is drained via line 246 and ultimately fed to crude distillation column 244 where STC and TCS are separated. Vapors 211 leaving condenser 249 continue to a series of condensers represented by 250. Typically, the terminal temperature in the series of condensers 250 is −25 to −50 C. The $H_2$ and relatively small concentrations of chlorosilanes leave condenser 250 in stream 212 where they are compressed in compressor 243, flow through line 213 to heater 247 and then join a stream of vaporized STC 227 coming from STC vaporizer 226. Stream 225 represents STC feed from other parts of the plant (CVD and/or silane operations) and stream 252 is a blowdown from the vaporizer.

TCS 245 leaving crude column 244 goes to further purification and from there to CVD operations 1. STC 224 leaves the bottom of the crude column and is fed to STC vaporizer 226 where it is vaporized and the mixed with $H_2$ coming from heater 247. This combined stream 214 is the fed through interchanger 207 (if an interchanger is used) through line 215 to trim heater 216 and finally into the bottom of the FBR as stream 217.

From the description above, it is apparent that the process involves many steps. The combination of high temperatures, high pressures, abrasive solids and corrosive environment make the process equipment quite specialized and expensive. Valves in MGSI lockhoppers and associated lines used to charge the FBR wear out. The FBR and quench vessel are typically made of expensive high nickel alloys that require specialized fabrication techniques which are also expensive. Handling abrasive slurries in bottoms streams at high pressures requires specialized pumps and careful design. Even then, these components have wear limited lifespans.

Since temperatures over 500° C. are required to achieve desirable kinetics and equilibrium in the FBR, heating feed streams uses significant thermal energy. Electric heaters typically used for this service are expensive to purchase and/or have limited life. Heat integration from the FBR exhaust stream before the quench is significantly complicated and limited due to fouling from deposition of volatile chloride salts of iron and aluminum byproducts created in the FBR from their respective metallic impurities in the MGSI.

For the reasons above, the hydrochlorination process is a relatively expensive process to build and to operate. The size of equipment is largely dictated by the $H_2$ flow through the FBR. Difficulties associated with availability of materials like metal plate and fabrication difficulties with the alloys used limit the size of FBR's and to a lesser extent quench vessels. Even with FBR's built as large as possible based on fabrication capabilities and process understanding, world scale plants today have as many as 8 or more parallel hydrochlorination trains. This is far more than are required for reliability. Multiple units are necessary primarily because the capability to build larger trains does not exist and/or the incremental cost of larger trains is prohibitive due to fabrication difficulties. It is reasonable to expect technology will evolve and larger units of substantially the same design can be built in the future, but these size increases using parallel technology are expected to be somewhat incremental and without significant impact on the economics. A solution increasing capacity and/or capital cost per unit capacity is quite valuable to the industry.

Depending on efficiency of the process, energy costs can be either the greatest or second greatest cost in producing TCS in a polysilicon plant. Purchased MGSI is typically the other highest cost though economics vary from site to site. Reducing energy requirements are key to reduce operating costs.

FIG. 3 shows detail for a typical STC hydrogenation plant 3 of FIG. 1B. In this process, STC 327 from CVD reactors or a silane plant (stream 326) and recycle stream 325 is fed to STC vaporizer 329 and then through line 301 where it is mixed with $H_2$ from stream 302 and fed through line 303 into STC converter 304. The molar ratio of feeds is typically 2.0:1 to 3:1 $H_2$:STC. In the STC converter approximately 18% of the STC fed is reacted to form TCS and HCL. The product stream 305 flows through a condensation train 306 consisting of one or more condensers and then through line 307 to a compressor 308 where the pressure is elevated to enable recycle of the $H_2$ and also to make subsequent condensation more efficient. After leaving the compressor, the gas flows through line 309 to condensation train 310 representing one or more condensers. Stream 311 then flows into a countercurrent HCl Absorber 312 where cold chlorosilanes 313 are flowing countercurrent to the rising gas coming from 311. HCl and more volatile chlorosilanes are absorbed and exit through the bottom of the absorber via stream 314. Stream 314 then flows to HCl stripper column 315 where the HCl is distilled away from the chlorosilanes via stream 319 and is directed to the direct chlorination plant 4 of FIG. 1B. Chlorosilanes free of HCl leave the bottom of the HCl stripper in stream 316. Part of the flow follows line 321 to crude column 323 where STC and TCS are separated. TCS 324 is fed to a purification train and then to CVD operations 1 of FIG. 1. The remainder of the flow from the HCl stripper bottoms stream is fed through line 322 to absorber feed cooler 318 and then through line 313 into the HCl absorber. STC from the crude column is fed through line 325 where it is combined with STC 326 from CVD operations 1, and fed to the STC Vaporizer. A small blowdown 328 from the STC vaporizer 329 purges impurities.

It should be understood that variations of this flow path utilizing various heat integration schemes are possible, and that the essential steps of an STC converter OGR used in industry are nearly universal. Those steps being condensation, compression, HCl absorbtion and HCl stripping. Many plants include a PSA (pressure swing adsorption) and/or TSA (temperature swing adsorption) step where the $H_2$ of stream 302 flows through a solid media to further adsorb HCl and other components from the $H_2$. This TSA or PSA process consumes additional energy in that it must be heated and cooled (for TSA) or components are periodically purged into a low pressure stream (the PSA) process. The energy requirements in the TSA process are heating and cooling of the adsorptive media along with providing cooling and heating associated with the heat of adsorption and desorption. In the PSA process, either large amounts of purge gases are lost, or secondary recovery systems must be built to recover valuable gases from the purge.

The OGR in an STC hydrogenation process producing HCl byproduct is a significant capital investment and energy intensive part of the process. Refrigeration equipment is expensive and consumes large amounts of electricity to cool stream 313 feeding the HCl Absorber and run a condenser in HCl stripper 319. Thermal energy required to strip HCl from the chlorosilanes in the HCl Stripper is also quite large. Since most STC converters operate at 4-7 Bar pressure and the HCl Absorber typically runs at 12-15 bar, significant energy is consumed in the compressor. Due to fairly low suction pressure, the compressors required are relatively large and capital intensive as well. When efficient high capacity converters as described in U.S. Patent Publication No. 2012/0328503 A1 are used, the cost of the OGR significantly exceeds the cost of the STC converters and most of the cost in the OGR is in the portions dedicated to removing HCl from $H_2$ and subsequently recovering the HCl in a relatively pure form. An OGR having lower capital and operating costs represents a high potential to reduce capital expenditure and energy consumption.

All patents, patent applications, provisional patent applications and publications referred to or cited herein, are incorporated by reference in their entirety to the extent they are not inconsistent with the teachings of the specification.

SUMMARY OF THE INVENTION

The present invention provides a process minimizing both capital and operating costs to make trichlorosilane (TCS) in a polysilicon plant by simplifying the STC converter OGR, improving heat integration, and combining STC converter and hydrochlorination processes in ways not previously envisioned despite many years practice of each process. To avoid the capital and operating costs to remove HCl from $H_2$ in the OGR of the STC converter based plant, the $H_2$ stream is flowed through a fluidized bed reactor to react substantially all of the HCl and a portion of the $H_2$. This can be done using either a direct chlorination FBR or a hydrochlorination FBR, but is especially advantageous in a hydrochlorination FBR. Both processes are described. The net benefit of the hybrid hydrochlorination/converter process (the hybrid process) is a nominal 60% increase in the capacity of a hydrochlorination process having the same $H_2$ flow (ie. 1.6 times the capacity of a hydrochlorination process of the same size) as a traditional HC process while using approximately 25%-50% less energy per unit TCS produced. This can be retrofitted into an existing hydrochlorination plant at a very favorable capital investment cost for capacity expansion versus building either a new hydrochlorination train or an STC converter hydrogenation unit.

When coupled with a direct chlorination process, the size of the FBR must be increased and a means to recycle $H_2$ from the direct chlorination FBR incorporated. Given the significant modifications required, this is probably not attractive as a modification to an existing plant, but is an option for new construction.

BRIEF DESCRIPTION OF THE SEVERAL VIEWS OF THE DRAWINGS

The objects and features of the invention can be better understood with reference to the drawings described below, and the claims. The drawings are a combination of standard schematic symbols and generic blocks to denote process unit operations and/or equipments. Drawings are not necessarily to any scale, emphasis instead generally being placed upon illustrating the principles of the invention. In the drawings, like numerals are used to indicate substantially similar unit operations and streams throughout the various views.

DETAILED DESCRIPTION OF THE INVENTION

Figure 1A:
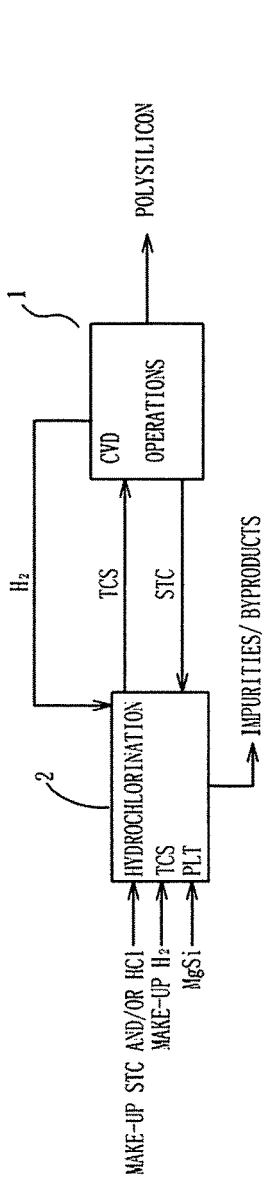
FIG. 1 is a summary block flow diagram of entire polysilicon plants. It shows three configurations FIG. 1A, FIG. 1B, and FIG. 1C encompassing known commercially significant plant-wide configurations.

Throughout the description, where apparatus, compositions, mixtures, and composites are described as having, including, or comprising specific components, or where processes and methods are described as having, including, or comprising specific steps, it is contemplated that, additionally, there are compositions, mixtures, and composites of the present invention that consist essentially of, or consist of, the recited components, and that there are processes and methods of the present invention that consist essentially of, or consist of, the recited processing steps.

It should be understood that the order of steps or order for performing certain actions is immaterial so long as the invention remains operable. Moreover, two or more steps or actions may be conducted simultaneously.

It is contemplated that methods, systems, and processes of the claimed invention encompass scale-ups, variations, and adaptations developed using information from the embodiments described herein. Methods and processes described herein may be conducted in semi-continuous, and/or continuous operation. Reactors may be single-stage or multi-stage, and may be singular or plural without explicitly stating so It is contemplated that methods of the invention may be implemented in completely new facilities or combined or supplemented with existing reactors, systems, or processes that are known in the art such as fluidized bed reactor (FBR) processes used to make TCS from hydrogen chloride (HCl) and metallurgical grade silicon, or FBR processes to make TCS from hydrogen, STC and metallurgical grade silicon. Known, suitable techniques for separation of reaction products, recirculation of reactants, isolation and purification of reaction products, etc may be adapted for application in various embodiments of the claimed invention.

The mention herein of any publication, for example, in the Background section, is not an admission that the publication serves as prior art with respect to any of the claims presented herein. The Background section is presented for purposes of clarity and is not meant as a description of prior art with respect to any claim.

As used herein, a "halosilane" is understood to be a compound of the general formula $R_nSiZ_{4-n}$, where the radicals R are identical or different and are each hydrogen or an organic radical, such as an alkyl group $C_nH_{2n+1}$, and n is 0, 1, 2 or 3. Z is a halogen from the group Fluorine, Chlorine, Bromine, Iodine. When Z is chlorine (Cl), the halosilane is a chlorosilane. For example, in one embodiment the radicals R are —H, —$CH_3$, or a combination thereof. In certain embodiments, each R is —H. In certain embodiments, the integer n is 0, 1 or 2. In certain embodiments, n is 0. In preferred embodiments, the halosilane is tetrachlorosilane (silicon tetrachloride, STC). In other embodiments, the halosilane is a bromosilanes, chlorodisilane or methyltrichlorosilane. Anywhere a chlorosilane is referred to, other halosilanes are considered equivalent. i.e. bromosilanes, fluorosilanes, or iodsilanes.

As used herein, "portion" means a part or all of the whole. A "part" as used herein means the whole from which components have been partially removed therefore effecting the relative concentration of those components in each part.

As used herein, interchanger is understood to mean a heat exchanger exchanging thermal energy between two process streams. Any heat exchanger can be an interchanger if heat is transferred between two process streams.

As used herein, countercurrent is understood to mean flows in opposite directions such that a hot fluid might enter one end of a heat exchanger flowing one direction while a cold fluid enters the opposite end of the heat exchanger and flows directly opposite the direction of the hot fluid. It may also mean, for example, a gas flows in substantially one direction (typically upward) while a liquid flows in substantially the opposite direction (typically downward) such as in mass transfer equipment comprised of trays and mass transfer packings.

Figure 2:
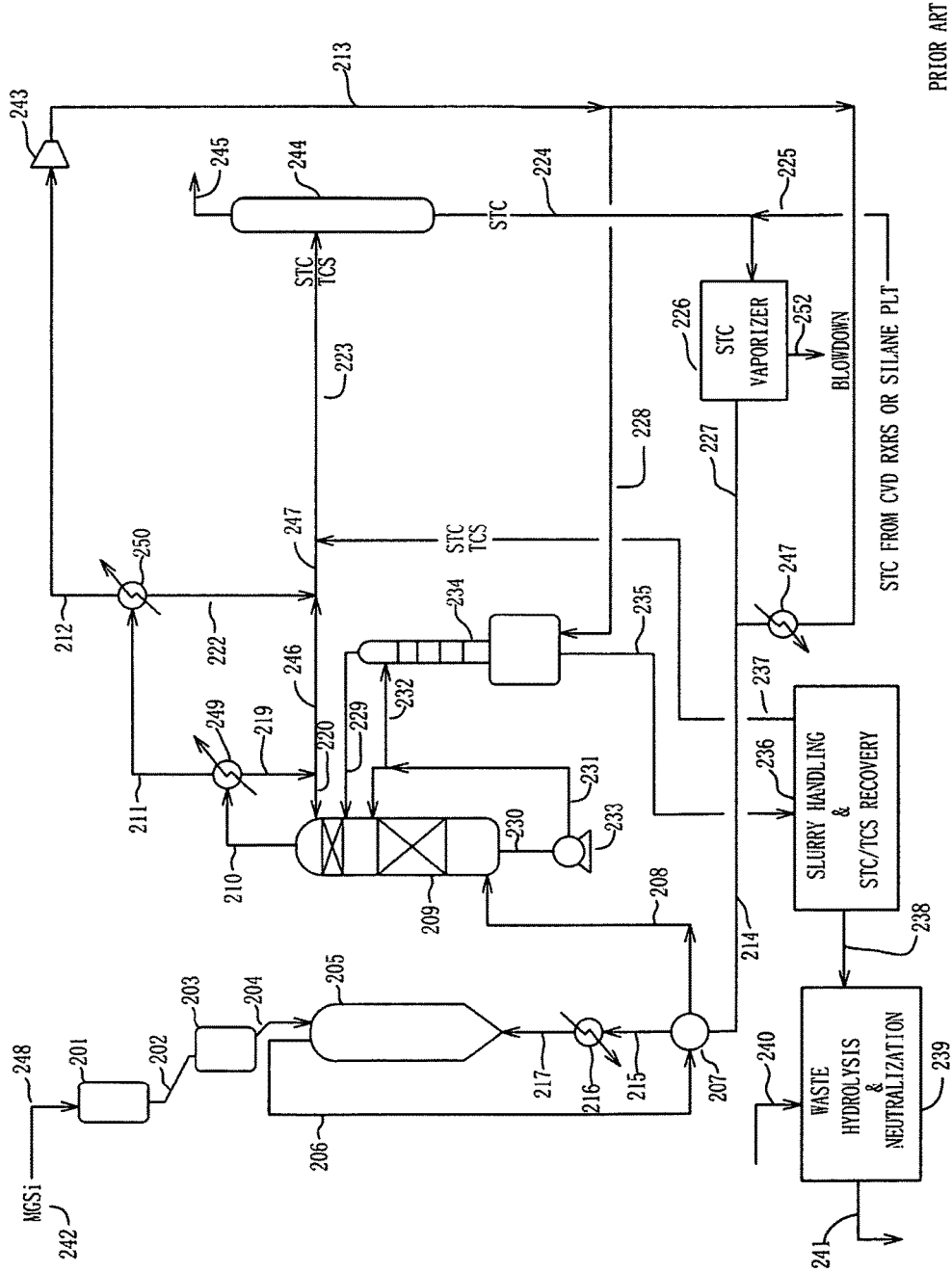
FIG. 2 is a representative schematic diagram of the hydrochlorination TCS plant of FIG. 1A.

As provided herein, an STC Converter capable of operation at pressures greater than 12 bar and preferably greater than 18 bar, and with a pressure vessel rating preferably equal to about 30 bar or more is installed in what would normally be the suction line 212 of the $H_2$ compressor 243 in a hydrochlorination plant of FIG. 2. The new hydrogenation reactor preferably features a highly efficient heat exchanger having minimal gas residence time on the product gas side and a circular heating zone contained at the radial center and axial end of the hydrogenation reactor. After leaving the heating zone, gas flows around the heating zone and back into the interchanger where it heats the feed gas. In addition to the advantages over Siemens style hydrogenation reactors, this design also has significant advantages over other designs referenced by patents previously cited in simplicity, ease of fabrication, maintenance, capacity, and cost.

Figure 1B:
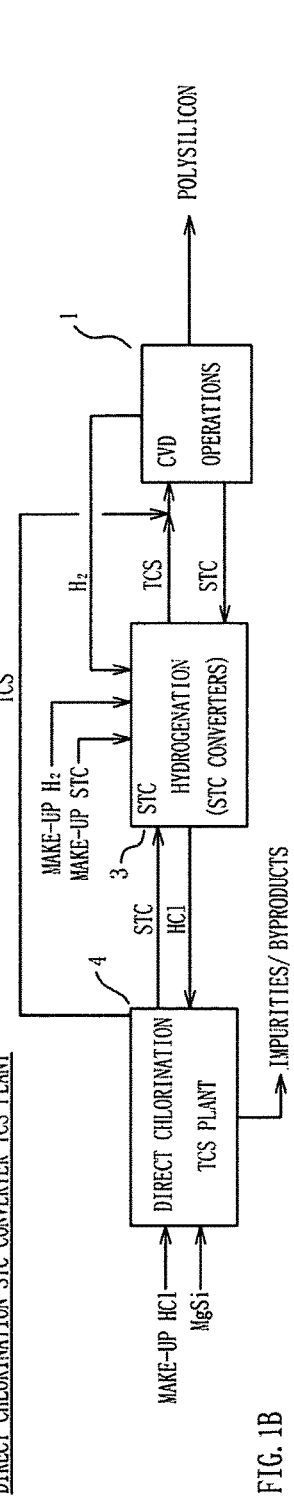
Figure 1C:
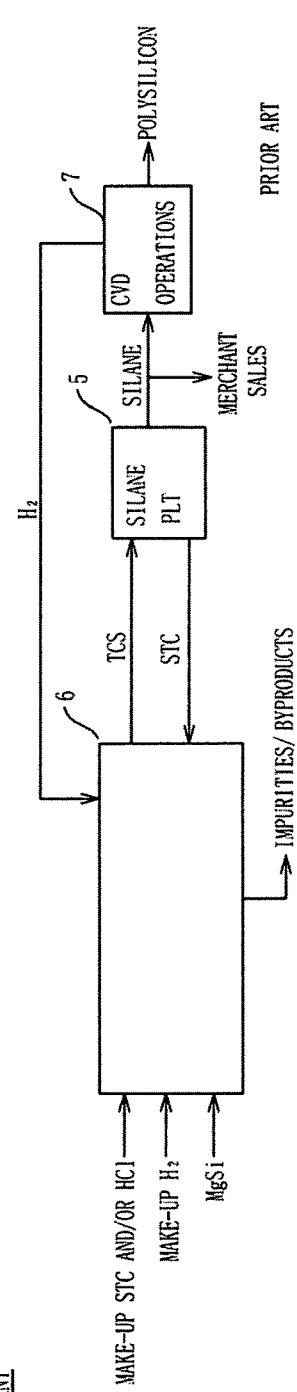

FIG. 1 is representative of major process steps within most existing closed loop polysilicon production facilities. It is a summary block flow diagram of entire polysilicon plants. It shows three configurations of known commercially significant plantwide configurations. Additional operations could be defined within a polysilicon facility and minor recycle streams may exist that are not shown. Details not shown are not highly relevant to this invention and are omitted for brevity and ease of understanding essential concepts. FIGS. 1A, 1B, and 1C are previously described in some detail within the background section of this document.

FIG. 2 is a representative schematic diagram of the hydrochlorination TCS plant of FIG. 1A substantially the same as that described in U.S. Pat. No. 8,298,490 B2. For hydrochlorination technology, it shows the major unit operations associated with synthesis of TCS and STC. Separation of a crude TCS product is shown, but additional purification steps as well as minor recycle streams are not necessarily shown as they are not essential to this invention.

Figure 3:
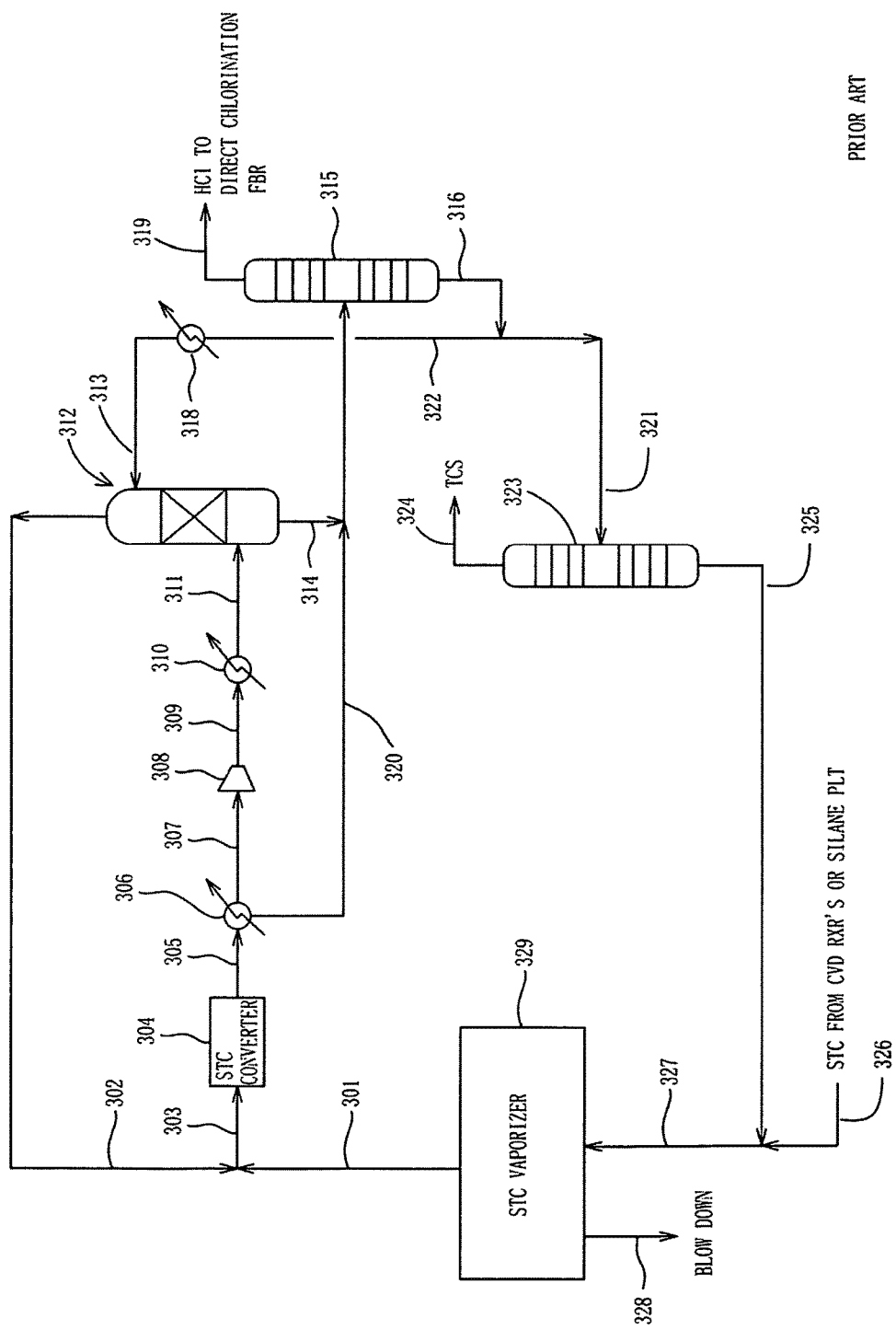
FIG. 3 is a representative schematic diagram of the STC hydrogenation portion of a direct chlorination plant of FIG. 1B showing a typical STC converter operation and it's associated feed system and OGR.

FIG. 3 is a representative schematic diagram of the STC hydrogenation portion of a direct chlorination plant of FIG. 1B as practiced in industry. It shows the key steps to hydrogenate STC to TCS and the associated OGR to recover TCS and HCl products from the hydrogenation reaction and to recycle unreacted H$_2$ and STC streams. It shows separation of a crude TCS product. Additional purification steps as well as minor recycle streams are not necessarily shown as they are not essential to this invention.

Figure 4:
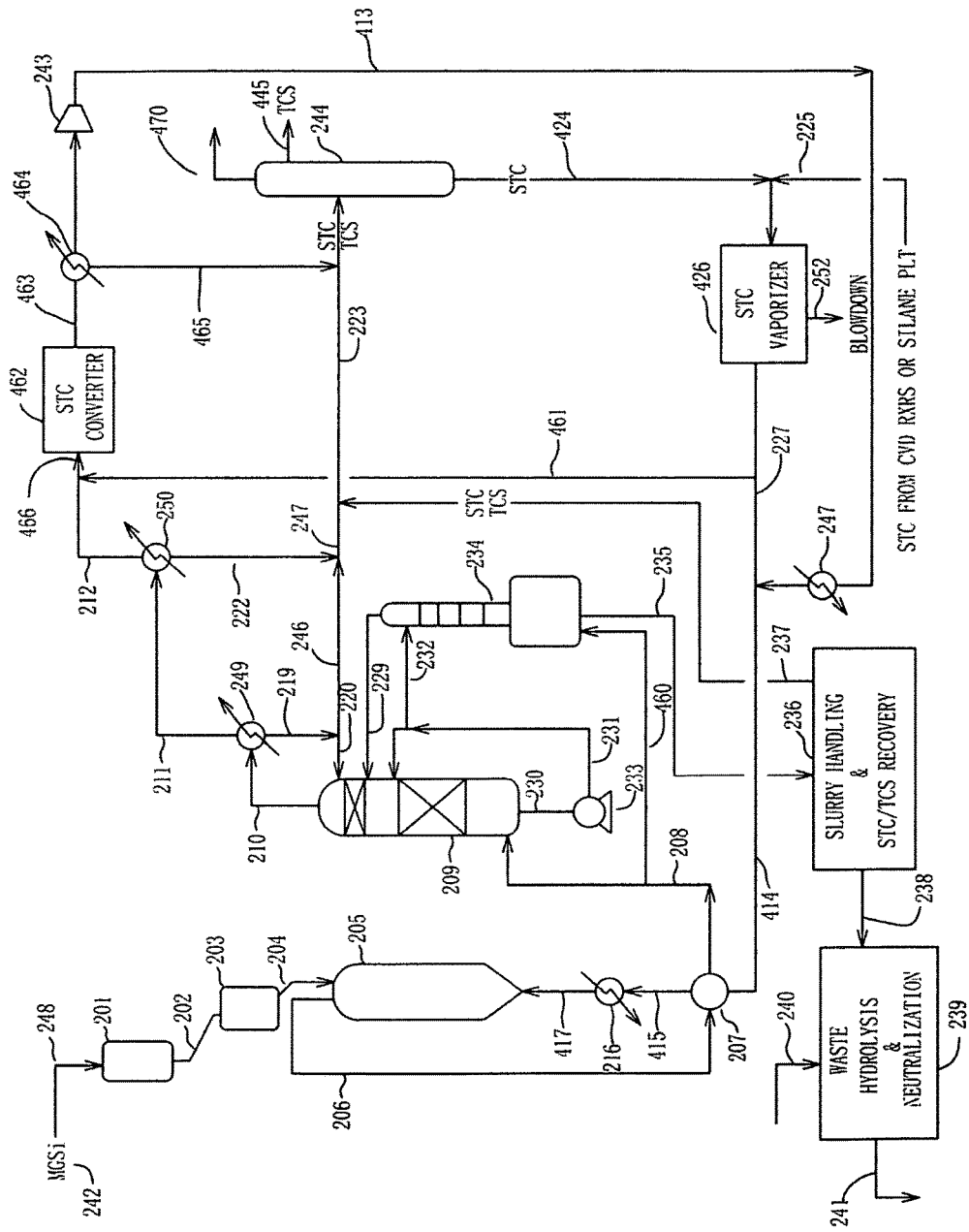
FIG. 4 is a representative schematic diagram of the hybrid process of this invention where an STC converter 462 (or STC converters) and simple condensation train 464 are installed in series with the hydrchlorination FBR, its quench, and condensation train.

FIG. 4 is a representative schematic diagram of the hybrid process of this invention where an STC converter 462 (or STC converters) and simple condensation train 464 are installed in series with the hydrochlorination FBR, its quench, and condensation train. Like numerals with FIG. 2 can be considered substantially the same as those of FIG. 4. The hybrid process of FIG. 4 uses the same H$_2$ compressor 243 as FIG. 2 displacing substantially the same amount of H$_2$ gas. In FIG. 4, streams 413, 414, 415 and 417 are essentially the same as respective streams 213, 214, 215, and 217 of FIG. 2 except that the four 4XX streams will have a higher concentration of HCl (~6 vs ~0.1 mole %) versus the four respective 2XX streams of FIG. 2. These four streams are otherwise similar. Streams 424 and 445 are substantially the same function and composition as 224 and 245 respectively.

Streams 461, 463, 465, and 466 (STC converter related streams; STC feed, combined feed, exhaust, and exhaust condensate) serve largely the same functions respectively as streams 301, 305, 320, and 303. Pressures in the 4XX streams are greater than typical practice for the 3XX streams and compositions are slightly different. Equipment 426 is an STC vaporizer feeding STC vapor to both the FBR 205 and the STC converter(s) 462. Stream 470 is a distillation vent.

Key advantages of the hybrid process are as follows;
1) The capacity of a hydrochlorination process can be increased approximately 60% or more with investment only in a larger (or supplemental) STC vaporizer, an STC converter, and a fairly simple and low cost condensation train following the STC converter. The cost of this is estimated to be substantially less than 60% of the cost of an entire hydrochlorination FBR process built from scratch.
2) The dominant reaction in the direct chlorination FBR

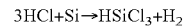

is very exothermic. The net reaction in a hydrochlorination reaction,

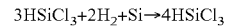

is slightly endothermic. By constructing the hybrid process where both reactions occur simultaneously in the hydrochlorination FBR of FIG. 4, temperatures in the FBR will be approximately 20-25 C higher than the feed temperature versus 20-25° C. lower than the feed temperature of FIG. 2 representing a significant cost reduction to heat the feed stream in the hybrid process.
3) Trim heaters 216 typically have a limited life impacted significantly by operating temperature. The ability to operate them at lower temperature while keeping the FBR temperature the same or higher increases the lifespan of the heaters.
4) Operating the hydrochlorination FBR at higher temperatures with the same or lower trim heater temperatures is possible due to the exothermic reaction. Increasing FBR temperature will increase the conversion of STC to TCS in each pass, increasing capacity by more than the approximately 60% previously stated.
5) The hybrid process enables opportunities for heat integration not present in either process individually, further reducing the energy costs. Examples of heat integration steps are detailed on FIG. 5.
6) In sites with scarce space available for new construction or expansion, the hybrid process provides an opportunity consuming considerably less ground area.

Figure 5:
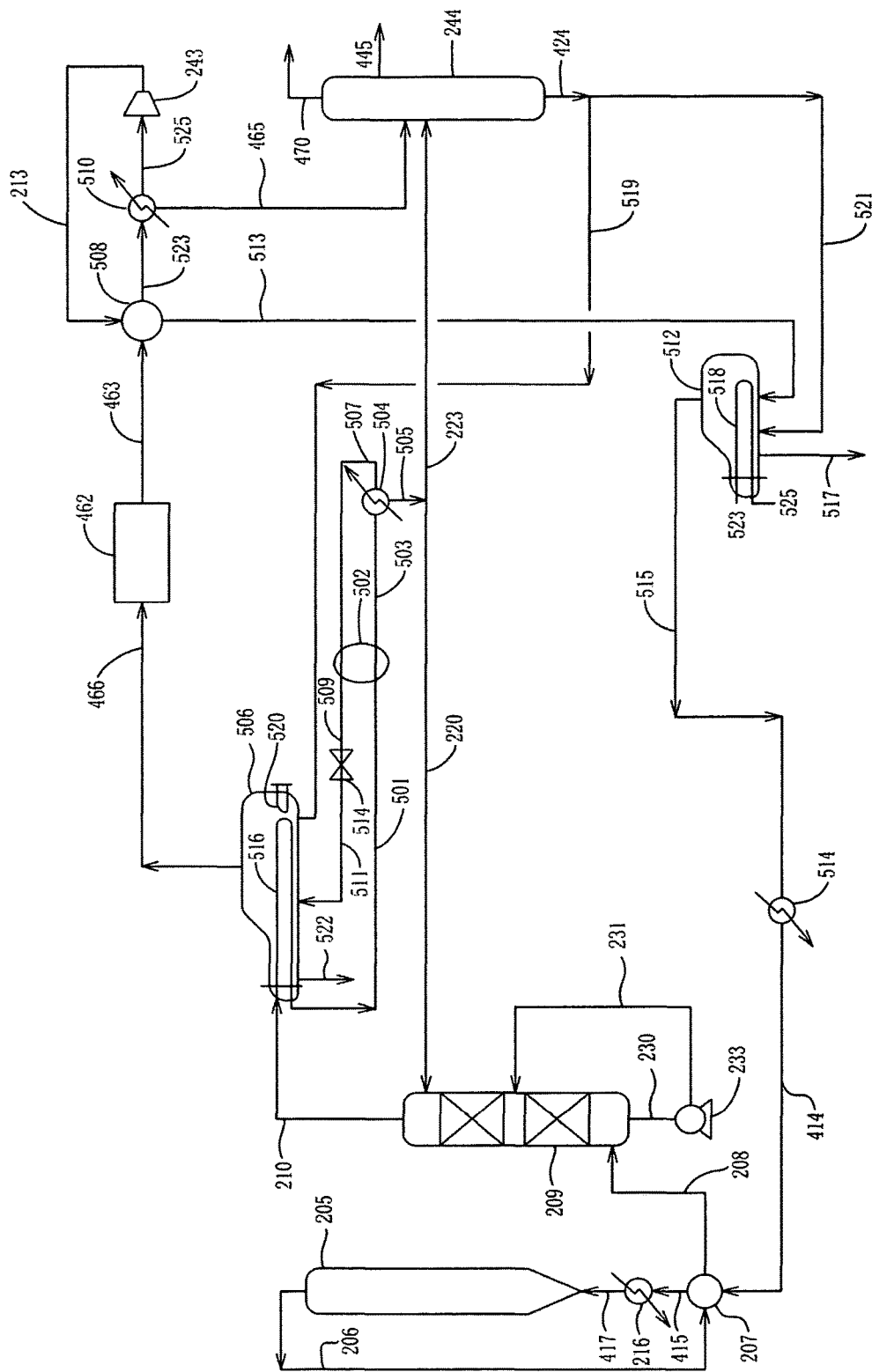
FIG. 5 is a schematic diagram of a hybrid hydrochlorination/converter process showing key heat integration steps.

FIG. 5 is a schematic diagram of a hybrid hydrochlorination/converter process showing key heat integration steps enabled by combining a process with STC converter 462 and hydrochlorination FBR 205. Saturated vapor stream 210 leaving quench tower 209 is at a high enough temperature that it can be used to provide a major portion of the heat load required to vaporize the STC in stream 519. This is possible because the pressure in stream 210 is higher than stream 466 and because the desired ratio of H$_2$:STC in stream 466 is lower than in stream 210. After stream 210 flows through coil 516 in STC vaporizer 506 it flows through line 501 to interchanger 502, through line 503 to condensation train 504 consisting of one or more heat exchangers, and back through interchanger 502 in stream 507. Pressure reducing valve 514 between lines 509 and 511 controls the feed pressure to the STC vaporizer 506, thus controlling the H$_2$:STC ratio in stream 466. Condensate from 504 flows into streams 223 and 220. A supplemental heating coil 520 can be used to provide operating flexibility between composition and pressure in stream 466.

Gas leaves STC converter 462 and flows through line 463 to interchanger 508 where it heats stream 213. Cooled stream 523 flows to condensation train 510 consisting of one or more heat exchangers and then through line 525 to compressor 243. Small amounts of STC and TCS remain in stream 213 that is predominantly H$_2$ and HCl. Heated stream 513 flows into STC vaporizer 512 which has supplemental heating from heat transfer media 523 flowing through heating coil 518 and out through stream 525. STC is fed to vaporizer 512 through line 521. Saturated stream 515 flows through heater 514 and then to the FBR as previously described for FIG. 4. With thoughtful design practices known to those skilled in the art, much of the heat required to vaporize STC in vaporizer 512 will be provided by the sensible heat in stream 513 as it cools to the saturation temperature of stream 515. Streams 517 and 522 are blowdowns to remove highboiling impurities from the process.

Figure 6:
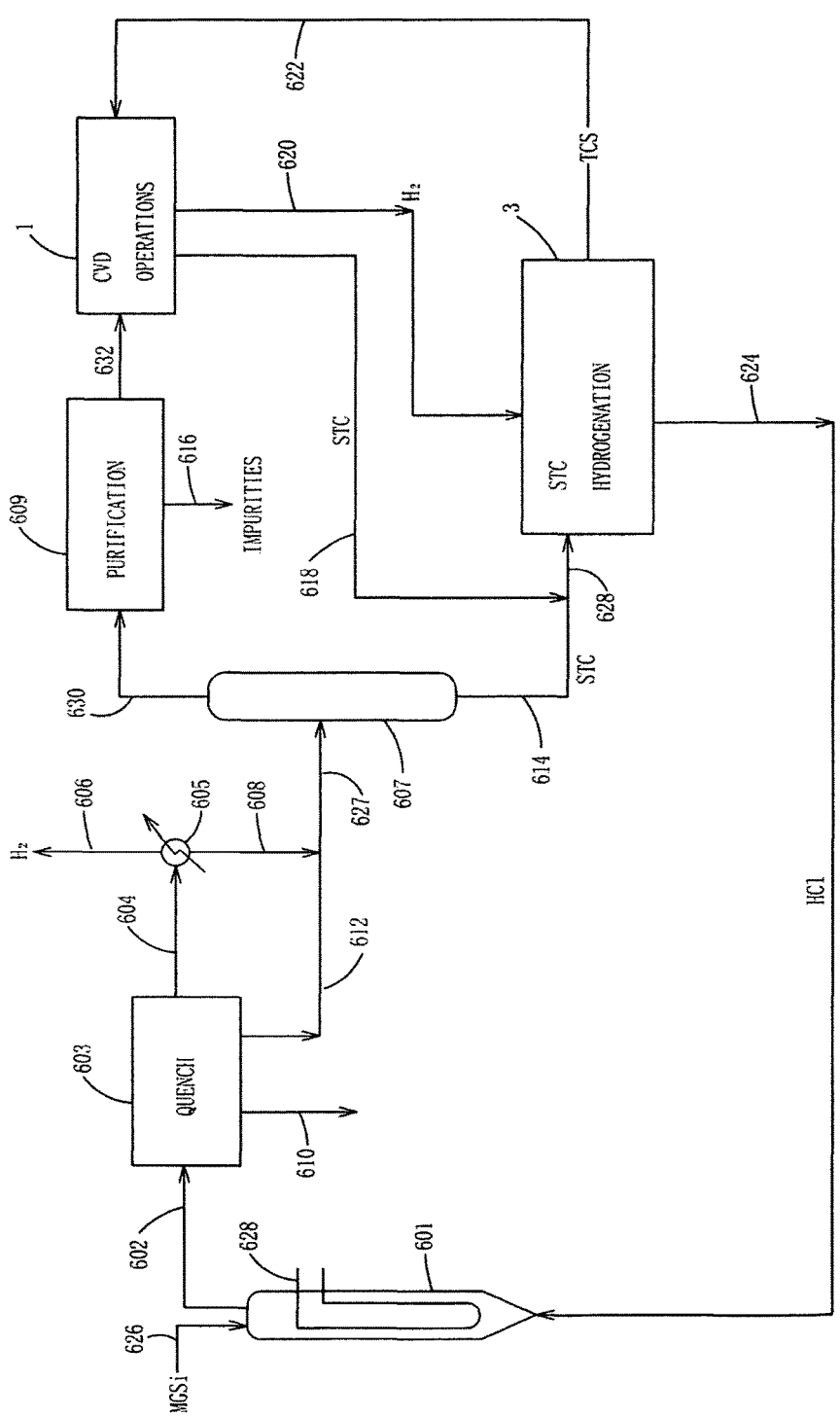
FIG. 6 is a representative schematic diagram of a direct chlorination TCS plant of FIG. 1B.

FIG. 6 is a representative schematic diagram showing details of the direct chlorination TCS plant 4 of FIG. 1B. The STC hydrogenation process 3 shown in FIG. 1B is detailed in FIG. 3. In FIG. 6, MGSI 626 is fed to direct chlorination FBR 601 and HCl gas 624 is fed to the bottom of the FBR 601. The reaction of HCl 624 with MGSI 626 to make TCS and STC is highly exothermic and heat is removed with heat transfer media 628 through cooling coils or equivalent in FBR 628. Essentially all HCl fed in stream 624 is reacted in FBR 601. Reaction products TCS, STC, and $H_2$ flow through line 602 to quench operation 603. The configuration and function of quench 603 is largely the same as for vessels 209, 234 and 249 of the hydrochlorination process of FIG. 2, namely to remove silicon solids and volatile salts which are removed in stream 610. Some condensed TCS and STC leave the quench through stream 612 and go to distillation column 607 where TCS and STC are separated. $H_2$ and uncondensed chlorosilanes leave the quench operation in stream 604 to enter condensation train 605 consisting of one or more heat exchangers. Condensate 608 flows to distillation in line 627. TCS from distillation 630 goes through a purification train 609 where impurities 616 are removed and then to CVD operations 1 via stream 632. In the traditional direct chlorination process, $H_2$ is vented to atmosphere through stream 606 and is lost. The direct chlorination FBR 601, its quench 603 and condensation train 605 typically operate at 2-7 bar pressure, thus requiring colder condensation temperatures in the condensation train to achieve the same percentage recovery of chlorosilanes than is required in the hydrochlorination process TCS separated in distillation column 607 is fed to a purification train and finally to CVD operations 1. STC from column 607 leaves through line 614 and go to the STC hydrogenation operation 3. Sub-processes within CVD operations 1 are the same as has been previously described. STC 618 and $H_2$ byproducts 620 are recycled to STC hydrogenation 3. TCS 622 from hydrogenation is fed to CVD operations 1.

Figure 7:
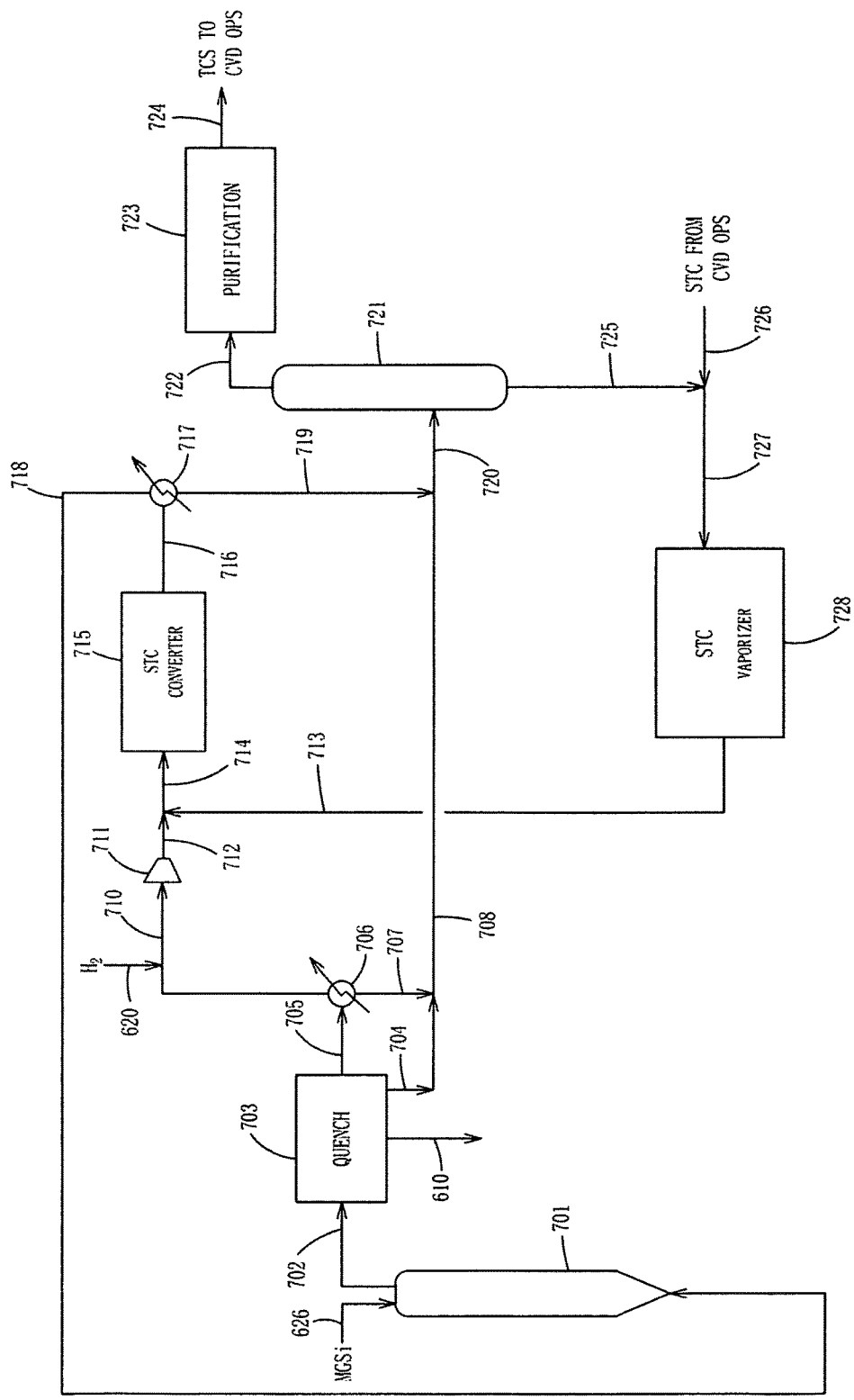
FIG. 7 is a representative schematic diagram of the hybrid process of this invention with an STC converter and simple condensation train are installed in series with a direct chlorination FBR.

FIG. 7 is a schematic diagram of the process using direct chlorination and STC converters without separating HCl from the $H_2$ produced in STC converters. Unlike the hybrid process involving STC converters and hydrochlorination where STC converters can be added into an existing hydrochlorination loop of FIG. 2 with very minimal modifications, this process is very different from a typical direct chlorination TCS plant and the design is believed practical only if built as a new facility. In this process, $H_2$ and HCl in stream 718 and MGSi 626 are fed to direct chlorination FBR 701 operating at approximately 330° C. and 7 barG. The $H_2$ will go through the FBR largely unreacted, but substantially all of the HCl present will react to form STC and TCS in essentially the same proportions as in FBR 601. The FBR must be larger diameter to deal with the increased volume of gas flow due to the $H_2$ in stream 718. Heat removal from FBR 701 by heat transfer media will be slightly less than in FBR 601 because the $H_2$ flowing through the reactor will take out some of the heat. Gas stream 702 leaves FBR 701 to a quench operation 703, then to line 705 and condensation train 706 whose design and function is similar to Quench 603 and condensation train 605. Vapors leave condensation train 706 to be joined by $H_2$ produced in CVD operations and feed compressor 711 via line 710. Impurities are removed in line 610. Temperatures must be lower in condensation train 706 than condensation train 605 due to the much higher concentration of non-condensible $H_2$. Condensate streams 704 and 707 combine in 708 and with condensate 719 from the condensation train 717 of the STC converter 715. Combined stream 720 flows into distillation column 721 which separates TCS and STC. STC leaves column 721 through line 725, is joined by STC coming from CVD reactor ops 1 in stream 726. The combined flow 727 then goes to STC vaporizer 728. The STC is vaporized into stream 713 and joins the $H_2$ in stream 712 coming from compressor 711. The combined flow is stream 714 flowing into converter 715. 716 is the exhaust stream from converter 715 containing TCS and HCl along with unreacted $H_2$ and STC fed to STC converter 715 in stream 714. Condensation train 717 condenses substantially all of the chlorosilanes from the $H_2$ in stream 716 into stream 719 which then flows to distillation column 721. Vapor stream 718 leaves condenser 717 and flows back to the FBR 701. $H_2$ stream 712 can be preheated in an interchanger with stream 716 (not shown) and fed to STC vaporizer 728 to reduce heat load on the vaporizer 728 and condensation train 717. TCS 722 leaves distillation column 721 to go through purification train 723 prior to being fed to CVD operations via stream 724.

Constructive Examples

Standard engineering techniques using chemical engineering simulation software widely used in industry (Chemcad, Version 6, provided by Chemstations, 3100 Wilcrest Drive, Suite 300, Houston, Tex., USA and Aspenplus, Version 8, provided by AspenTech, 20 Crosby Drive, Bedford, Mass., USA) were used to model and compare the energy consumption per unit TCS produced in a traditional TCS plant associated with polysilicon production. The processes of FIG. 5, FIG. 2, and FIG. 3 are compared (in these comparisons, the energy for separation of STC from TCS by distillation in equipments 244 and 323 are not included). Physical properties, thermodynamic models, and equations of state known by those skilled in the art to be sufficiently accurate for industrial applications were used. The industrial range stated below is based on the inventor's industry experience of designs and operating parameters associated with current industrial state-of-the-art processes of FIGS. 2 and 3 and are consistent with prior art descriptions of this document.

| | Total Energy (kW hr/kg TCS) | |
|---|---|---|
| Process | Fully Optimized | Industrial Range |
| FIG. 2 hydrochlorination synthesis | 0.55 | 0.6-1.5 |
| FIG. 3 STC Converter hydrogenation | 0.68 | 0.9-3.5 |
| FIG. 5 Hybrid process | 0.30 | |

It is understood that the foregoing examples are merely illustrative of the present invention. Certain modifications of the articles and/or methods employed may be made and still achieve the objectives of the invention. Such modifications are contemplated as within the scope of the claimed invention.

The invention claimed is:

1. A process for making trihalosilanes, the process comprising the steps of:
   a. reacting feeds of silicontetrahalide and hydrogen in a homogenous gas phase reactor and exhausting a gaseous stream having at least one trihalosilane and a hydrogen halide and unreacted feeds;

b. condensing at least a part of the gaseous stream to a dewpoint of less than or equal to about −25° C. to remove at least trihalosilane and silicontetrahalide as a condensate and feeding at least a portion of the remaining gaseous stream containing predominantly hydrogen and hydrogen halide into a fluidized bed reactor;

c. feeding a silicon feed and a silicontetrahalide feed to the fluidized bed reactor and reacting the silicon feed with hydrogen halide under direct chlorination conditions and also reacting the silicon feed with hydrogen and silicontetrahalide under hydrochlorination conditions to produce the at least one trihalosilane;

wherein the hydrogen halide is not separated from the hydrogen in the remaining gaseous stream before feeding it into the fluidized bed reactor.

2. The process of claim 1, wherein said silicontetrahalide is silicontetrachloride, said hydrogen halide is hydrogen chloride, and said at least one trihalosilane is trichlorosilane.

3. The process of claim 1, wherein said fluidized bed reactor produces an exhaust gas and heat from the exhaust gas is used to heat a portion of at least one of the feeds to said homogeneous gas phase reactor.

4. The process of claim 1, wherein said gas phase reactor produces an exhaust gas and heat from the exhaust gas is used to heat a portion of at least one of the feeds to said fluidized bed reactor.

5. A process for making trihalosilanes, the process comprising the steps of:

a. reacting feeds of silicontetrahalide and hydrogen in a homogenous gas phase reactor and exhausting a gaseous stream having at least one trihalosilane and a hydrogen halide and unreacted feeds;

b. condensing at least a part of the gaseous stream to a dewpoint of less than or equal to about −25° C. to remove at least trihalosilane and silicontetrahalide as a condensate and feeding at least a portion of the remaining gaseous stream containing predominantly hydrogen and hydrogen halide into a fluidized bed reactor;

c. feeding a silicon feed and a silicontetrahalide feed to the fluidized bed reactor and reacting the silicon feed with hydrogen halide under direct chlorination conditions and also reacting the silicon feed with hydrogen and silicontetrahalide under hydrochlorination conditions to produce the at least one trihalosilane;

wherein the hydrogen halide is not separated from the hydrogen in the remaining gaseous stream before feeding it into the fluidized bed reactor, wherein the fluidized bed reactor produces an exhaust gas, and heat from the exhaust gas is used to heat a portion of at least one of the silicontetrahalide and hydrogen feeds to the homogeneous gas phase reactor, and wherein heat from the gaseous stream of the homogeneous gas phase reactor is used to heat a portion of at least one of the silicon and silicontetrahalide feeds to the fluidized bed reactor.

6. The process of claim 1, wherein silicontetrahalide is removed from said condensate and at least a portion of said silicontetrahalide feed of said fluidized bed reactor is the removed silicontetrahalide.

7. The process of claim 5, wherein silicontetrahalide is removed from said condensate and at least a portion of said silicontetrahalide feed of said fluidized bed reactor is the removed silicontetrahalide.

8. A process for making trihalosilanes, the process comprising the steps of:

a. reacting feeds of silicontetrahalide and hydrogen in a homogenous gas phase reactor and exhausting a gaseous stream having at least one trihalosilane and a hydrogen halide and unreacted feeds;

b. condensing at least a part of the gaseous stream to a dewpoint of less than or equal to about −25° C. to remove at least trihalosilane and silicontetrahalide as a condensate and feeding at least a portion of the remaining gaseous stream containing predominantly hydrogen and hydrogen halide into a fluidized bed reactor;

c. feeding a silicon feed and a silicontetrahalide feed to the fluidized bed reactor and reacting the silicon feed with hydrogen halide under direct chlorination conditions and also reacting the silicon feed with hydrogen and silicontetrahalide under hydrochlorination conditions to produce the at least one trihalosilane;

wherein silicontetrahalide is removed from said condensate and at least a portion of said silicontetrahalide feed is the removed silicontetrahalide;

wherein the hydrogen halide is not separated from the hydrogen in the remaining gaseous stream before feeding it into the fluidized bed reactor, wherein the fluidized bed reactor produces an exhaust gas, and heat from the exhaust gas is used to heat a portion of at least one of the silicontetrahalide and hydrogen feeds to the homogeneous gas phase reactor, and heat from the gaseous stream of the homogeneous gas phase reactor is used to heat a portion of at least one of the silicon and silicontetrahalide feeds to the fluidized bed reactor.

* * * * *